United States Patent [19]

Lesiecki

[11] Patent Number: 4,475,736
[45] Date of Patent: Oct. 9, 1984

[54] BUSHING SEAL VALVE

[75] Inventor: Gerald Lesiecki, Greendale, Wis.

[73] Assignee: Allis-Chalmers Corporation, Milwaukee, Wis.

[21] Appl. No.: 465,602

[22] Filed: Feb. 10, 1983

[51] Int. Cl.³ .............................................. F16J 15/00
[52] U.S. Cl. .......................................... 277/3; 277/75
[58] Field of Search ................................ 277/3, 27, 75

[56] References Cited

U.S. PATENT DOCUMENTS 3,580,587  5/1971  Borm ........................................ 277/3
3,588,124  6/1971  Guinard ................................... 277/3
3,989,258  11/1976  Kunderman .......................... 277/25

Primary Examiner—Robert I. Smith
Attorney, Agent, or Firm—Timothy R. Conrad

[57] ABSTRACT

A bushing seal is disclosed for sealing a rotary member and having a face portion which engages a stationary housing and the pressure of a sealing fluid admitted to the bushing urges the face portion against the housing with a force sufficient to prevent freezing of the bushing when the pressure of the sealing fluid is high. A valve is provided for bleeding sealing fluid from a side of the bushing opposite a side against which the sealing fluid is exerting pressure. The valve permits variable flow rate of sealing fluid to atmosphere with the flow rate an inverse function of the pressure of the sealing fluid. By bleeding off fluid, the valve causes a pressure drop across the bushing with the sealing fluid urging the bushing against the housing with an additional force sufficient to prevent subsynchronous whirl when the pressure of the sealing fluid is low.

13 Claims, 2 Drawing Figures

BUSHING SEAL VALVE

BACKGROUND OF THE INVENTION

1. Field of the Invention

This invention relates to valves and more particularly, to a valve to improve the performance of a bushing seal surrounding a rotary shaft.

2. Description of the Prior Art

As shown in my U.S. Pat. Nos. 3,724,861 and 3,679,217, bushing seals are well known for sealing a rotary member such as a shaft or an impeller of a pump or compressor. Such bushing seals are used to seal a pressurized fluid contained, for example, within the interior of a compressor from a low pressure area such as ambient atmosphere. As shown in the above-mentioned U.S. patents, the bushing seal comprises a bushing surrounding an impeller with opposing surfaces of the bushing and the impeller defining a restricted fluid passageway between a high pressure area (such as the interior of the compressor) and a low pressure area (such as the ambient atmosphere). A sealing liquid is supplied to a pressure chamber defined between opposing surfaces of a housing surrounding the bushing and the bushing itself. The sealing liquid is supplied under pressure from the pressure chamber to the restricted fluid passage intermediate the low and high pressure areas. The fluid is supplied at sufficiently high pressures to effectively block a flow of process fluid within the compressor from the high pressure area toward the low pressure area. A face portion of the bushing abuts the housing surrounding the bushing and shaft and is urged against the housing by reason of the pressure of the sealing fluid to form a secondary seal. Bushing seals, as described above and shown in the aforementioned U.S. patents, are free floating within the potential movement of the shaft and restricted in movement by the frictional forces between the face portion of the bushing and a bushing housing (O-rings sealing the bushing from the housing provide only a negligible resistance to motion of the bushing).

Currently, pumps and compressors are being designed for applications having a wide range of pressures of contained fluids. At very high pressures, the sealing fluid is necessarily supplied at high pressure and, as a result, the bushing face portion may be urged against the housing at such a great force that the bushing essentially freezes and acts as an undesired bearing for the shaft. Accordingly, for pumps and compressors to be operated at high pressures, the face portion of the bushing is designed to have a sufficiently small effective area so the bushing does not freeze at the design operating pressures. However, when the compressor is operated at low pressures, there is little friction between the bushing and the housing (due to the small effective surface area of the face portion and necessary drop in sealing liquid pressure) resulting in the bushing becoming unstable and developing what is known as a subsynchronous whirl which may result in failure of the compressor shaft.

I have determined the phenomena of subsynchronous whirl may be avoided at low operating pressures by providing a valve which operates when the pump is operating at low pressures to generate an additional force urging the bushing face against the housing.

OBJECTS AND SUMMARY OF THE INVENTION

It is an object of the present invention to provide a valve for regulating flow from a high pressure area to a low pressure area where the flow through the valve is regulated to be an inverse function of the pressure of a fluid in the high pressure area.

It is a further object of the present invention to provide a bushing seal for a rotary member having a valve which, in response to the pressure of a sealing fluid, regulates a flow of fluid from a balance chamber to generate an additional force to urge a bushing face portion against a housing.

According to a preferred embodiment of the present invention, there is provided a valve having a valve body defining a cylindrical interior. A valve plug is positioned within the valve interior and movable within the interior along the axis of the interior. The valve plug comprises a piston head which separates the interior into a first chamber and a second chamber. Opposing surfaces of the piston head and valve body define an annular fluid passage for permitting fluid flow from the first chamber to the second chamber. A valve seat is included within the second chamber and has an axially extending bore in communication with a low pressure area. The valve plug has a tapered plug portion extending axially away from the piston head and sized to be received in the bore of the valve seat. The taper of the plug is such that the plug and the valve seat define an annular orifice having a maximum area when the valve plug is moved to a position of greatest distance from the valve seat and having a minimum area when the valve plug is moved to a position nearest the valve seat. A spring is provided urging the valve plug away from the valve seat. Means are provided for permitting fluid flow communication between the first chamber and a high pressure area.

The first chamber of the valve is provided in communication with a balance chamber defined between opposing surfaces of a bushing and a compressor housing. A fixed orifice through the bushing connects the balance chamber and a bushing pressure chamber in fluid flow communication. When the compressor is operating at low pressures, the force of the spring in the valve is sufficient to urge the valve plug away from the valve seat and present the maximum area annular orifice within the valve permitting flow from the balance chamber of the bushing a makeup flow through the fixed orifice provides a differential pressure across the bushing resulting in the face portion of the bushing being urged against the housing. As the operating pressure of the compressor increases, the pressure of a sealing liquid supplied to the bushing increases. At the increased pressures, the valve plug is urged toward the valve seat resulting in the annular orifice presenting a smaller area. As a result, fluid flow is restricted through the valve and there is a reduced pressure differential across the bushing. Accordingly, a smaller additional force is presented urging the bushing face against the housing. A predetermined operating pressure, the valve plug is fully compressed against the seat so there is no pressure drop across the bushing to the balance chamber and the bushing face is urged against the housing with only a nominal force large enough to impede subsynchronous whirl of the bushing.

DESCRIPTION OF THE PREFERRED EMBODIMENT

Figure 1:
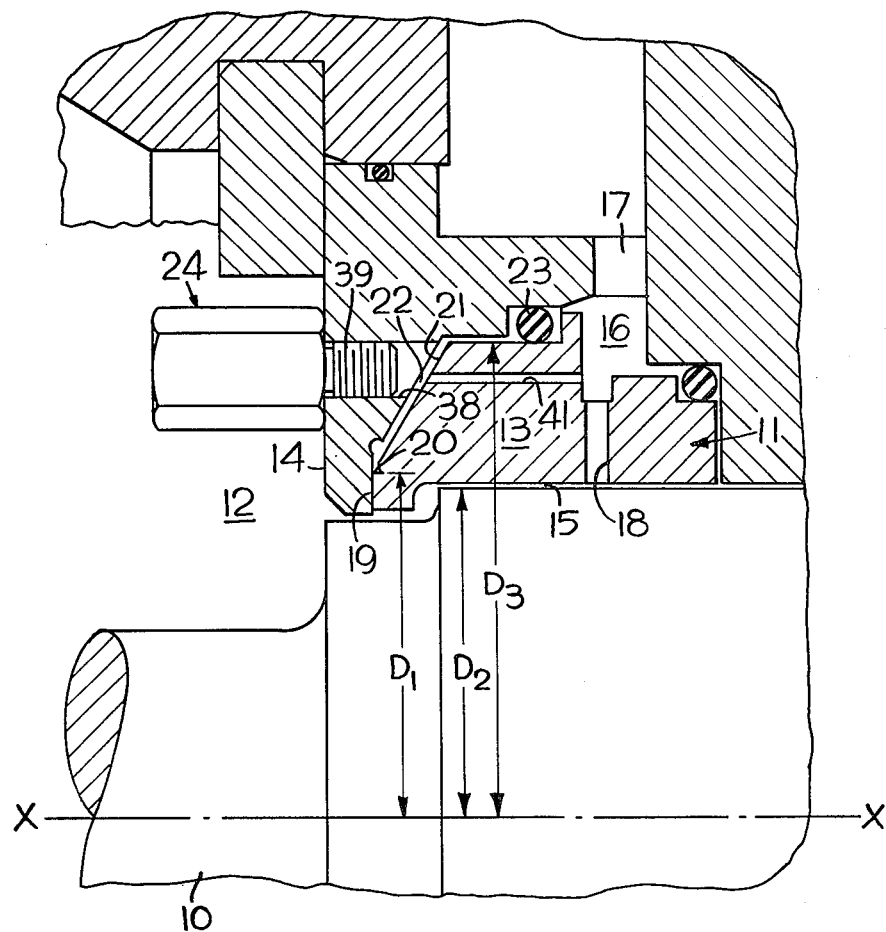
FIG. 1 is a cross-sectional view of a bushing seal and a rotary shaft.

Referring now to FIG. 1, there is shown a rotary member 10 such as a shaft for a compressor having a bushing seal 11 for sealing a high pressure fluid area (such as the interior of the compressor) from a low pressure fluid area 12 (such as ambient atmosphere). The bushing seal comprises a bushing 13 surrounding the shaft 10 and enclosed within a stationary housing 14. Opposing surfaces of the shaft and bushing define a restricted fluid passage 15 between the high and low pressure areas. The bushing and housing cooperate to define a pressure chamber 16 having an inlet port 17 formed within the housing and in communication with a source (not shown) of a sealing fluid. A port 18 formed within the bushing permits fluid flow communication between the pressure chamber 16 and the restrictive fluid passage 15 intermediate the high and low pressure areas.

The bushing is provided with a face portion 19 generally perpendicular to the axis of the shaft. The face portion 19 abuts the housing. An outer radial edge 20 of the face portion 19 abuts the housing at a radial distance $D_1$ from the shaft axis X—X greater than the radial distance $D_2$ from the shaft axis to the restricted fluid passage. The area of the face portion 19 abutting the housing 14 between these distances is an unbalanced face area. A radial face 21 of the bushing on a side thereof opposite the pressure chamber 16 and the housing 14 cooperate to define a sealed balance chamber 22 between radial distances $D_1$ and $D_3$ which is sealed from the pressure chamber by means of an O-ring 23. Balance chamber 22 is referenced to (that is, in fluid flow communication with) pressure chamber 16 through a constant diameter balancing hole 41 which may conveniently be referred to as a fixed orifice 41. When pressurized fluid is introduced to the pressure chamber 16, the bushing is urged against the housing by reason of the unbalanced face area. The force urging the face portion 19 due to the unbalanced face area may be conveniently referred to as a nominal face load.

A bushing seal as described above forms no part of this invention and is more fully described in U.S. Pat. Nos. 3,724,861 and 3,679,217. In operation of a compressor with a bushing seal as described, a sealing fluid under pressure is introduced to the pressure chamber 16 and flows into the restricted fluid passageway 15. The pressure of the sealing fluid is adjusted to be equal to or slightly higher than the pressure in the high pressure area to be sufficient to block a flow of fluid from the high pressure area toward the low pressure area. As the pressure within the compressor increases, the pressure of the sealing fluid is correspondingly increased. Likewise, as the pressure of the fluid within the compressor is decreased, the pressure of the sealing fluid is correspondingly decreased to minimize the loss of the sealing fluid to the interior of the compressor resulting in contamination of process fluids within the compressor. The pressure of the sealing fluid within the pressure chamber acts against the unbalanced face area of the face portion of the bushing urging it against the housing. For compressors operating at very high pressures, the unbalanced face area is kept small such that the nominal force is not so great as to result in freezing of the bushing yet high enough to prevent subsynchronous whirl of the bushing. However, at low operating pressures, the pressure of the sealing fluid is correspondingly decreased with the result that the nominal force urging the face portion against the housing may be sufficiently low to present a danger of bushing instability and subsynchronous whirl.

I have determined the dangers of bushing instability may be overcome with a valve 24 which bleeds off fluid from the balance chamber 22 to provide an additional force urging the face portion against the housing when the pressure of the sealing fluid is low.

Figure 2:
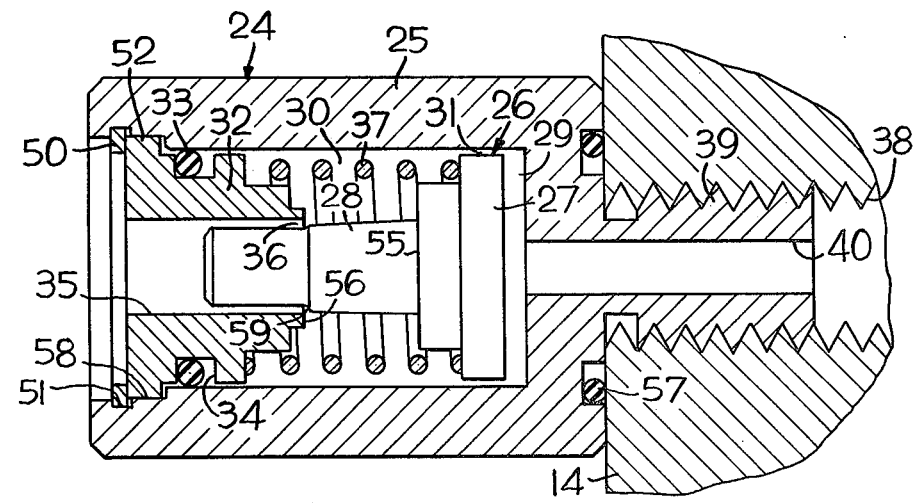
FIG. 2 is a cross-sectional view of a valve according to the present invention.

Referring to FIG. 2, the valve 24 of the present invention is shown comprising a valve body 25 having a generally cylindrical interior. A valve plug 26 is positioned within the interior having a generally cylindrical piston head 27 and a tapered plug 28 extending axially from the piston head. The piston head separates the interior of the valve body into a first chamber 29 and a second chamber 30 with the tapered plug occupying the second chamber. The piston head 27 and valve body 25 are sized so opposing cylindrical surfaces of the piston head and valve body define a generally cylindrical fluid passage 31 between the first and second chambers permitting fluid flow between the chambers. The valve plug 26 is axially movable within the interior of the valve body.

A valve seat 32 is provided within the second chamber and is generally cylindrical with the cylindrical surface of the valve seat sealed against the cylindrical surface of the valve body by means of an O-ring 33 received within a circumferential recess 34 formed within the valve seat. A snap ring 50 and a flange 52 of the seat 32 are received within circumferential recesses 51 and 58 in the valve body 25 and retains the seat 32 within the body 25.

An axially extending bore 35 extends through the seat permitting fluid flow communication between the second chamber 30 and a low pressure fluid area such as ambient atmosphere. The tapered plug 28 of the valve plug and the bore 35 of the seat 32 are mutually sized for the plug to be received within the bore with opposing surfaces of the plug and seat defining an annular orifice 36. The plug is tapered so it has a greatest cross-sectional area adjacent the piston head and a smallest cross-sectional area remote from the piston head. The area of the annular orifice 36 defined between opposing surfaces of the plug and the seat varies from a maximum area when the valve plug 26 is moved to a maximum stroke away from the valve seat and a minimum area when the valve plug 26 is moved to a minimum stroke and fully seated against the seat with a radial sealing surface 55 of plug 26 engaging a radial sealing surface 56 of seat 32. A spring 37 is provided within the valve body separating the valve seat and piston head and urging the piston head away from the valve seat.

Referring now to FIG. 1, the first chamber 29 of the valve interior is in fluid flow communication with the balance chamber 22 by means of a threaded orifice 38 formed through the housing which receives a threaded extension 39 of valve body 25 having an orifice 40 therethrough in communication with the first chamber 29 of the valve. An O-ring 57 seals abutting surfaces of the valve body 25 and the housing 14.

In operation of the bushing seal and valve thus far described, fluid under pressure within the pressure chamber 16 flows through the fixed orifice 41 into the balance chamber 22 and again flows through the orifice 38 within the housing to the valve 25. The pressure within the first chamber 29 of the valve urges the valve plug 26 against the urging of the spring 37 and moves the plug further within the valve seat bore 35. As the valve moves further into the bore, the annular orifice 36, due to the taper of the plug 28, reduces in area until it is sufficiently small such that it restricts flow of fluid such that the pressure in the first chamber 29 times the area of the annular orifice 36 is essentially equal to the urging of the spring 37. At this point, an equilibrium condition occurs at which the valve plug is stationary permitting a restricted flow of fluid from the bushing chamber through the valve. As a result of the flow of fluid from the bushing chamber, there is a pressure differential between the pressure of the fluid within the balance chamber 22 and the pressure of the fluid within the pressure chamber 16. As a result of this diffence in pressure, a force is generated in addition to the nominal force tending to urge the face portion of the bushing toward the housing.

The taper of the plug 28 is selected so the pressure differential between the balance chamber 22 and the pressure chamber 16 is sufficient to generate a sufficient additional force so the resultant force of the additional force and the nominal face load is not smaller than a preselected minimum force needed to prevent subsynchronous whirl of the bushing. As will be apparent to those skilled in the art, the additional force generated will be equal to the pressure drop across the fixed orifice 41 times the area of the bushing presented between the outer radial distance $D_3$ of the bushing face portion and the outer radial distance $D_1$ of the bushing cavity. Accordingly, the taper of the plug 28 and the stiffness of the spring 37 of the valve can be selected so the ratio of the area of the fixed orifice 41 to the area of the annular orifice 36 will be sufficient to maintain the bushing face portion 19 against the housing 14 at any desired minimum force for any pressure of the sealing liquid within the pressure chamber 16. As can be seen from FIG. 2, the taper of the plug 28 is not linear and presents a sudden change in diameter as indicated at 59. The sudden change is needed since at any given desired minimum force urging the face portion 19 against the housing 14 the sealing fluid pressure is related to the fourth power of the ratio of the fixed orifice 41 and annular orifice 36. Accordingly, as the sealing fluid pressure increases, the annular orifice 36 must close quickly to maintain constant the desired minimum force.

In a preferred embodiment, when the pump is operated at low pressure, the sealing liquid supplied to the pressure chamber 16 is at a low pressure. Consequently, the pressure of the sealing fluid within the bushing chamber is low. As a result, the spring 37 of the valve urges the valve plug 26 to its maximum stroke with the annular orifice 36 attaining its maximum area. Accordingly, the sealing fluid is bled off from the balance chamber 22 through the valve at any desired flow rate to create a differential pressure between the pressure chamber 16 and the balance chamber 22 sufficient to generate an additional force which in addition to the nominal force equals or just exceeds the desired minimum force. As the operating pressure of the compressor increases, the pressure of the sealing fluid supplied to the pressure chamber 16 increases to block the flow of process fluids through the restricted fluid passage 15. As the pressure of the sealing fluid increases, the pressure of the fluid within the balance chamber 22 increases with the fluid entering the first chamber 29 of the valve urging the valve plug 26 toward the seat to an equilibrium position where the pressure of the fluid in the first chamber 29 times the now reduced area of the annular orifice 36 equals the force of the spring 37. With the area of the annular orifice 36 now reduced, the flow rate through the valve is reduced and the differential pressure between the pressure chamber 16 and the balance chamber 22 is reduced. Accordingly, the additional force generated by the differential pressure is reduced. However, the normal face load force generated by the pressure within the pressure chamber 16 acting on the unbalanced face area is increased due to the increased pressure within the pressure chamber 16 with the resultant of the additional force and normal force equaling or just exceeding the desired minimum force. Consequently, as the pressure of the sealing fluid within the pressure chamber 16 increases, the additional force becomes proportionately smaller and the nominal force becomes proportionately larger until the system reaches a predetermined pressure at which the valve plug is fully seated against the valve seat and the additional face load is zero and the normal face load exceeds the desired minimum face load. As the valve plug becomes fully seated, the radial sealing surface 55 of the plug 26 engages the radial sealing surface 56 of the seat 32 creating an effective area increase over seat bore 35 thus eliminating any plug instability. As the pressure within pressure chamber 16 is decreased, the plug moves toward maximum stroke and the reverse of the above-described process occurs. However, the plug unseats at a slightly lower pressure than that at which it seats due to the detent action of the effective area increase.

From the foregoing detailed description of the present invention, it has been shown how the objects of the present invention have been obtained in a preferred manner. However, modifications and equivalents of the disclosed concepts, such as readily occur to those skilled in the art, are intended to be included in the scope of this invention. Thus, the scope of the invention is intended to be limited only by the scope of the claims, such as or may hereafter be, appended hereto.

The embodiments of the invention in which an exclusive property or privilege is claimed or defined as follows:

1. A bushing seal for a rotary body for sealing a high pressure fluid area from a low pressure fluid area with said bushing seal comprising a bushing surrounding said rotary body and enclosed within a housing; opposing surfaces of said bushing and rotary member defining a restrictive fluid passage between said high and low pressure areas; means for supplying a flow of a sealing fluid to said passage intermediate said high and low pressure areas at a pressure sufficient to block a flow of a high pressure fluid from said high pressure area toward said lower pressure area; said bushing having a face portion abutting a portion of said housing and urged against said housing with a nominal force which varies in magnitude in response to the pressure of said sealing fluid; said bushing and said housing defining a chamber positioned such that at a pressure in said chamber less than the pressure of said sealing fluid, said face portion is urged against said housing with a force in addition to said nominal force; means for permitting fluid flow communication between said chamber and said means for supplying said flow of said sealing fluid; and valve means responsive to the pressure of said sealing fluid for regulating fluid flow from said chamber; said valve means having means defining an orifice connecting said chamber in fluid flow communication with a low pressure area; means for varying the size of said orifice inversely proportional to the pressure of said sealing fluid whereby a low additional force is provided when said sealing fluid is at a high pressure and a high additional force is provided when said sealing fluid is at a low pressure.

2. A bushing seal according to claim 1, wherein said valve means comprises a valve having a hollow valve body defining a valve interior and having a valve plug positioned within said interior for reciprocal movement therein; said valve plug having a piston head separating said interior into a first chamber and a second chamber with means defining a fluid passage between said first and second chambers; means for providing fluid flow communication between said first chamber and said chamber defined by opposing surfaces of said bushing and said housing;

a valve seat within said second chamber having a bore therethrough providing fluid flow communication between said second chamber and a low pressure area at a pressure lower than a pressure in said chamber defined by opposing surfaces of said bushing and said housing;

a plug extending from said piston head and sized to be received within said bore with said plug and bore mutually sized such that opposing surfaces of said plug and seat define an annular orifice having an area varying from a maximum area when said valve plug is moved within said interior to a maximum stroke away from said seat and a minimum area when said valve plug is moved to a minimum stroke nearest said seat; and means for urging said valve plug toward said maximum stroke whereby when said sealing fluid is at low pressure said chamber defined by said bushing and said housing is at low pressure and said valve plug is at full stroke providing an annular opening of large area permitting fluid flow from said chamber through said valve to said low pressure area and reducing the pressure in said chamber and providing a large force in addition to said nominal force and at high sealing fluid pressures said valve plug is moved against the urging of said means to provide an annular opening of small area permitting a small amount of fluid flow from said chamber and a small reduction of pressure within said chamber providing a small force in additional to said nominal force.

3. A bushing seal according to claim 2, wherein said means for supplying a flow of said sealing fluid comprises a pressure chamber defined by cooperating surfaces of said bushing and said housing with means for supplying said sealing fluid under pressure to said pressure chamber and means for permitting flow of said fluid from said pressure chamber to said restricted fluid passage and said means for permitting fluid flow communication between said chamber and said means for supplying said flow of said sealing fluid comprises an orifice through said bushing communicating with said chamber and said pressure chamber with said orifice being a fixed orifice being of constant minimum cross-sectional area.

4. A bushing seal according to claim 3, wherein said plug and bore are sized and said means urging said valve plug toward maximum stroke is selected to provide an annular orifice of an area sufficient to permit a flow of fluid through said valve to maintain the pressure within said chamber at a pressure sufficiently lower than said pressure within said pressure chamber to present a sufficient additional force such that a resultant force of said additional forece and said nominal force is not smaller than a preselected minimum force.

5. A bushing seal according to claim 4, wherein said preselected minimum force is a predetermined force uring said face portion against said housing and sufficient to prevent subsynchronous whirl of said bushing.

6. A bushing seal according to claim 5, wherein said interior of said valve body is generally cylindrical and said piston head is generally cylindrical with opposing cylindrical surfaces of said body and said piston head defining a generally cylindrical fluid passage between said first and second chambers as said means defining a fluid passage between said chambers and said plug extends generally axially away from said piston head.

7. A bushing seal according to claim 6, wherein said bore within said seat is cylindrical and said plug is tapered having a greatest cross-sectional area proximate said piston head and having a smallest cross-sectional area remote from said piston head.

8. A bushing seal according to claim 7, wherein said minimum area at said minimum stroke is sufficiently small to effectively block a flow of fluid through said bore toward said low pressure area.

9. A bushing seal according to claim 8, wherein said means for urging said valve plug toward said maximum stroke is a spring having one end engaging said seat and one end engaging said piston head in force transmitting relationship.

10. A bushing seal according to claim 9, wherein said valve seat is a cylindrical member having an axially extending bore with said seat secured within said second chamber with means for sealing said seat against said valve body.

11. A bushing seal according to claim 10, wherein said plug is sized to be essentially completely received within said bore at said minimum stroke with said piston head abutting said seat in sealing engagement.

12. A bushng seal according to claim 11, wherein said plug is tapered and said bore is sized and said spring is selected to provide an annular orifice having a preselected area for a given pressure of a fluid flowing into said first chamber and urging said plug against the urging of said spring.

13. A bushing seal according to claim 12, wherein said preselected area is an area sufficient to permit a flow of fluid through said valve sufficient to present a pressure drop across said fixed orifice to provide a sufficient additional force such that a resultant force of said additional force and said nominal force is not smaller than said preselected minimum force.

* * * * *